(No Model.)

2 Sheets—Sheet 1.

R. C. SMITH.
END BEARING FOR SCREW SHAFTS.

No. 553,140.

Patented Jan. 14, 1896.

Witnesses
Jno. G. Hinkel
J. C. Fairgrieve

Inventor
Rudolph C. Smith
by
Attorneys (No Model.) 2 Sheets—Sheet 2.
R. C. SMITH.
END BEARING FOR SCREW SHAFTS.
No. 553,140. Patented Jan. 14, 1896.
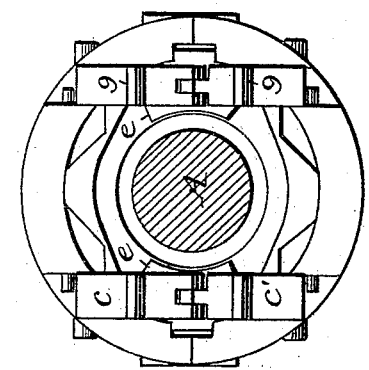
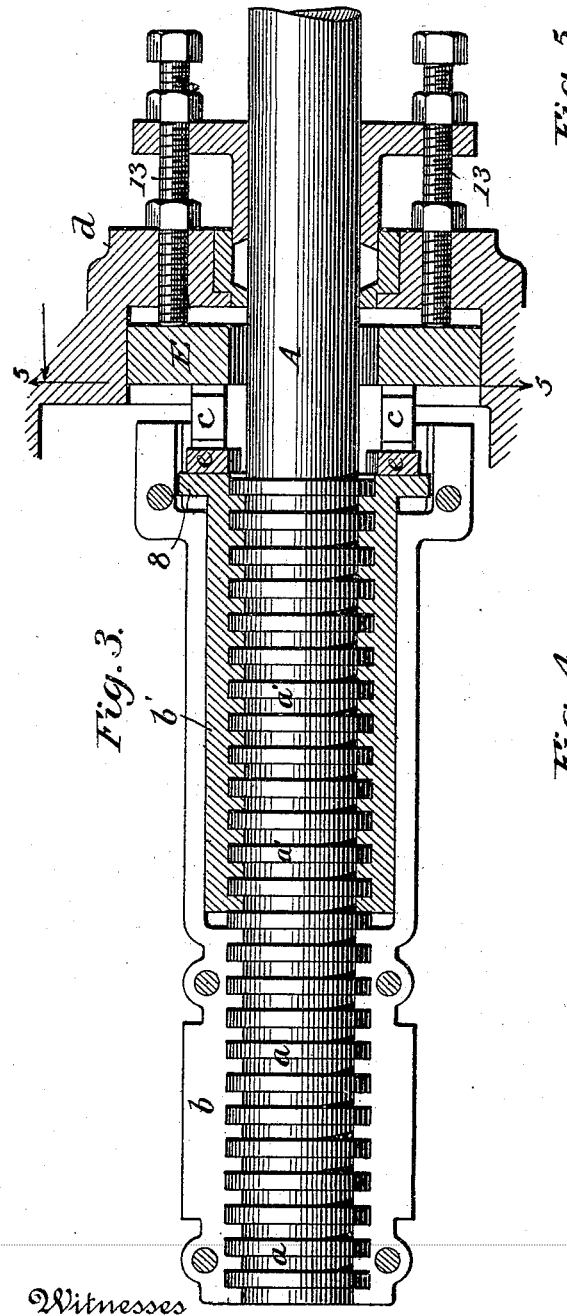
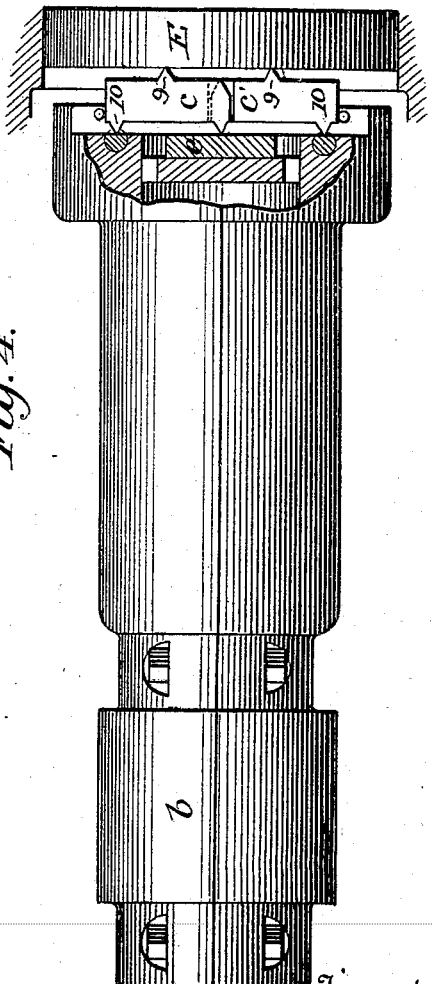
Witnesses
Inventor
Rudolph C. Smith
Attorneys

UNITED STATES PATENT OFFICE.

RUDOLPH C. SMITH, OF YONKERS, ASSIGNOR TO THE OTIS BROTHERS & COMPANY, OF NEW YORK, N. Y.

END BEARING FOR SCREW-SHAFTS.

SPECIFICATION forming part of Letters Patent No. 553,140, dated January 14, 1896.

Application filed February 14, 1895. Serial No. 538,432. (No model.)

*To all whom it may concern:*

Be it known that I, RUDOLPH C. SMITH, a citizen of the United States, residing at Yonkers, in the county of Westchester and State of New York, have invented certain new and useful Improvements in End Bearings for Screw-Shafts, of which the following is a specification.

My invention relates to that class of bearings for shafts in which the thrust of the shaft is upon grooved bearings adapted to collars upon the shaft; and my invention consists in dividing the bearings into sections, each engaging a part of the collars, and in providing a compensating support for the two sections, all as fully set forth hereinafter, and as illustrated in the accompanying drawings, in which—

Figure 1:
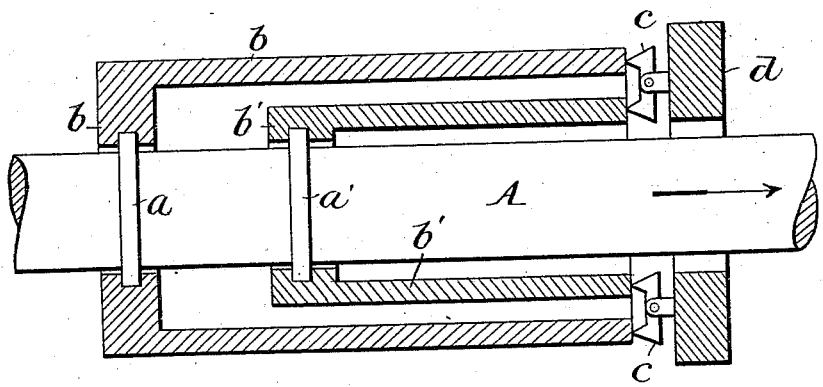
Figure 2:
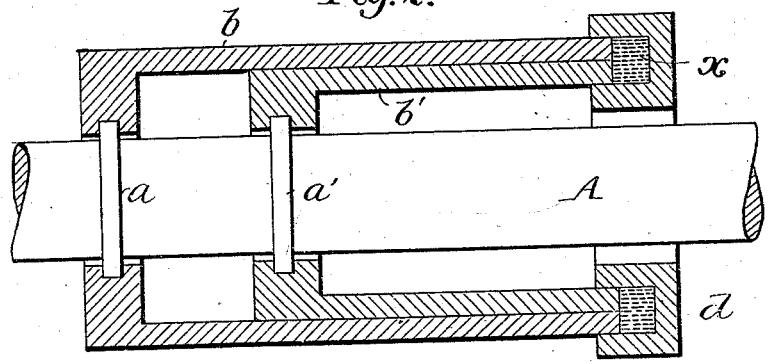

Figures 1 and 2 are diagrams illustrating the principle of my invention. Fig. 3 is a longitudinal section of a thrust-bearing embodying my invention; Fig. 4, a view of the said bearing in part section; and Fig. 5 is a transverse section on the line 5 5, Fig. 3.

Heretofore it has been customary in constructing the bearings for the screw-shafts of elevators, the shafts of propellers and other shafts where there is a heavy end-thrust, to provide such shafts with annular collars adapted to annular recesses in the boxes of the bearings, thereby securing a somewhat extended bearing-surface equal to the aggregate side faces of the collars. An objection to this construction is that the wear comes wholly upon one side of each collar, and also if the collars wear unequally in the course of time the extent of actual bearing-surface is reduced and there is a consequently increased friction and wear upon that portion which is active. In order to overcome this objection to this class of bearings I divide the channeled bearing-sleeve into sections which are separably adjustable, and preferably combine with such separably-adjustable sections a movable support of such a character that any undue strain upon one of the sections in one direction is transferred to the other in the opposite direction, thereby applying to this class of bearings the compensating feature set forth in connection with step-bearings in my Letters Patent No. 425,263, granted April 8, 1890.

For the purpose of illustrating my invention I will refer first to diagram Figs. 1 and 2, in which A represents a shaft having two collars $a\ a'$. The collar $a$ is adapted to a corresponding recess in a sleeve constituting a section $b$ of the bearing, and the collar $a'$ fits a recess in a sleeve constituting the section $b'$ of the bearing.

The ends of the sections $b\ b'$ are all in one plane, and the section $b$ bears upon the outer ends of a series of levers $c$, pivoted to the stationary frame $d$, while the section $b'$ bears upon the inner ends of the said lever.

It will be understood that any thrust upon the shaft A in the direction of the arrow will tend to bring the right-hand faces of the collars $a\ a'$ against their bearings, and so long as these faces wear uniformly the parts will occupy the relative positions indicated in the diagram; but if the face of the collar $a$ should wear away more rapidly than that of the collar $a'$ the thrust of the collar $a'$ upon the section $b'$ would throw out the inner ends of the levers $c$ and thrust the section $b$ toward the left, bringing its face against the face of the collar $a$, and that thus the faces of both sections are maintained in contact with the faces of the collars irrespective of the position in wear. The movable support is not necessarily a pivoted lever, for, as shown in the diagram Fig. 2, the ends of the sleeves $b\ b'$, proportioned to be of equal area, may extend into a chamber $x$ upon the frame and bear upon a body of liquid in said chamber with the same result as if they bore upon the lever $c$.

In the application of a bearing of this character the construction shown in Figs. 3, 4, and 5 is employed, wherein A shows the shaft, $a\ a'$ two series of collars, and $b\ b'$ two sections of the bearing, each recessed to receive one series of collars, the section $b'$ being a sleeve within an extension of the sleeve-section $b$, and having an annular flange 8, extending into a bell-mouth end of the sleeve $d$. The section $b'$ is divided longitudinally and held in proper relation to the shaft by the section $b$, and the latter is also divided longitudinally into two or more sections which are suitably clamped together.

The compensating supports for the two sections are in the form of levers $c$ $c'$, each having a central projection 9, constituting a fulcrum in contact with a support E, and a like projection 10 at the outer end bearing against the end of the sections $b$, and a projection 10 at the inner end bearing against the section $b'$. Where, as in the construction shown, the shaft extends through the end of the bearing where the compensating support must be, I arrange the levers $c$ $c'$ in pairs at opposite sides of the shaft, as best shown in Fig. 5, the inner ends of the levers bearing upon plates $e$, applied to the flanged end of the bearing-section $b'$. In order to properly adjust the parts in the first instance the support E is preferably made adjustable. Thus, as shown, it is in the form of a ring, against which bears adjusting-screws 13 13, extending through the frame $d$.

Without limiting myself to the precise construction and arrangement of parts shown and described, I claim—

1. The combination in a thrust bearing of a shaft provided with collars, a bearing in two sections each section engaging a portion of the collars, and a movable support for both sections through which the pressure upon one section is transferred to the other, substantially as described.

2. The combination in a shaft having a series of collars, of a bearing consisting of two sleeves, each engaging a portion of the collars, a series of levers, each bearing at one end upon one of the sleeve sections and at the other upon the other of the sleeve sections and a frame supporting the lever, substantially as set forth.

3. The combination of a shaft provided with collars, two recessed sleeves each engaging a part of said collars, and levers arranged at opposite sides of the shaft supported by the frame and each bearing at one end against one of the sleeve sections, and at the other against other of the sleeve sections, substantially as set forth.

4. The combination of a shaft provided with collars, a bearing having two sleeve sections, each engaging a part of the collars, levers bearing upon the two sleeve sections and a frame provided with an adjustable bearing for the levers, substantially as set forth.

5. The combination of a shaft provided with collars, of a bearing consisting of two sleeves arranged one within the other and each engaging a portion of the collars, levers arranged adjacent to the shaft and each bearing at one end against one of the sleeve sections, a support and an adjustable bearing on said support adapted to be engaged by the levers, substantially as described.

6. The combination of a shaft provided with collars, of a bearing consisting of two concentric sleeves arranged upon the shaft and each engaging a portion of the collars, and devices adapted to be engaged by both sections whereby when one of the sleeves is moved in one direction, a reverse movement will be imparted to the other, substantially as described.

In testimony whereof I have signed my name to this specification in the presence of two subscribing witnesses.

RUDOLPH C. SMITH.

Witnesses:
 HENRY L. BRANT,
 W. L. RICKARD.